G. R. McLERAN.
DRAY WAGON.
APPLICATION FILED JULY 13, 1907.
901,252.
Patented Oct. 13, 1908.
2 SHEETS—SHEET 1.
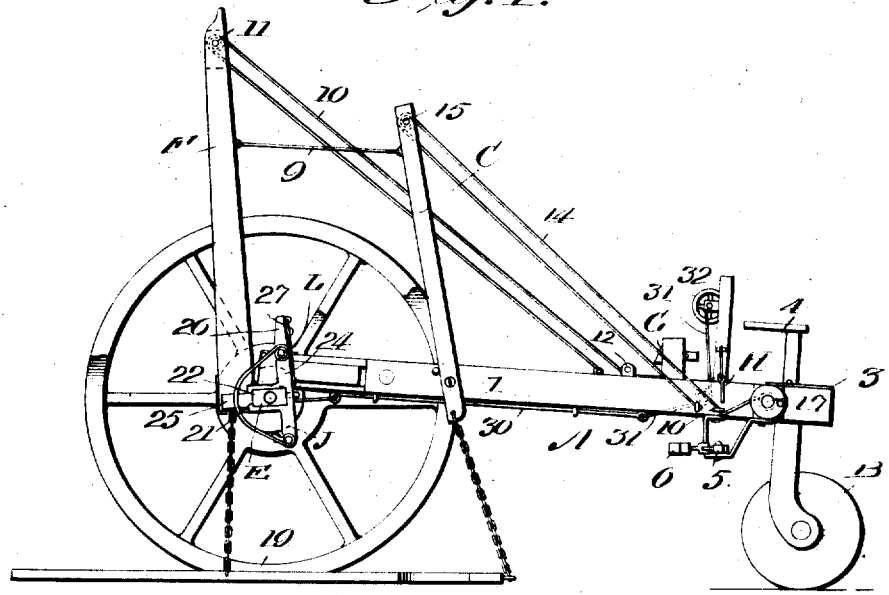
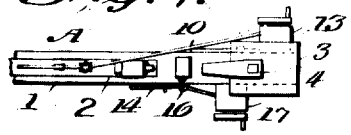
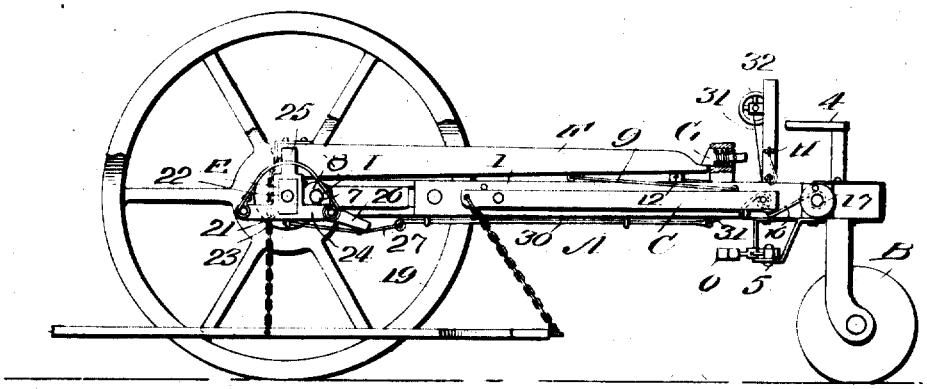
WITNESSES
INVENTOR
GUY R. McLERAN
BY Munn & Co.
ATTORNEYS G. R. McLERAN.
DRAY WAGON.
APPLICATION FILED JULY 13, 1907.
901,252.
Patented Oct. 13, 1908.
2 SHEETS—SHEET 2.
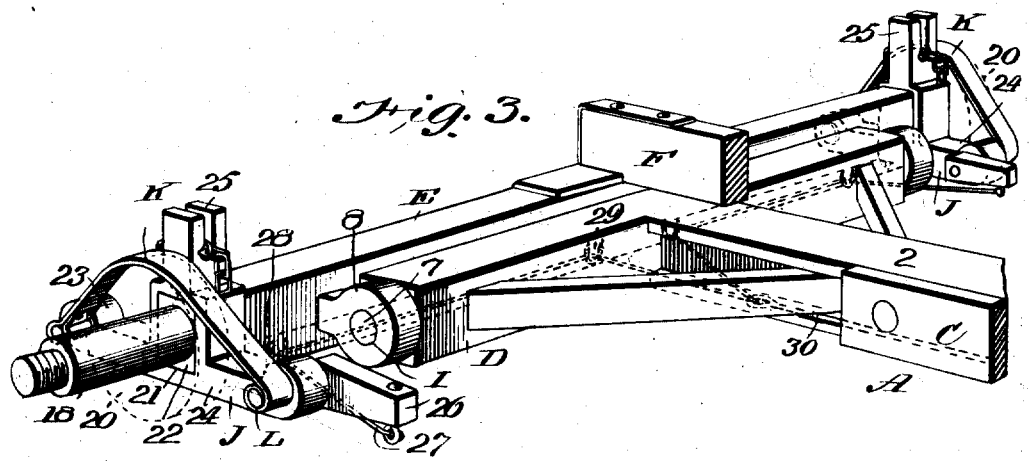
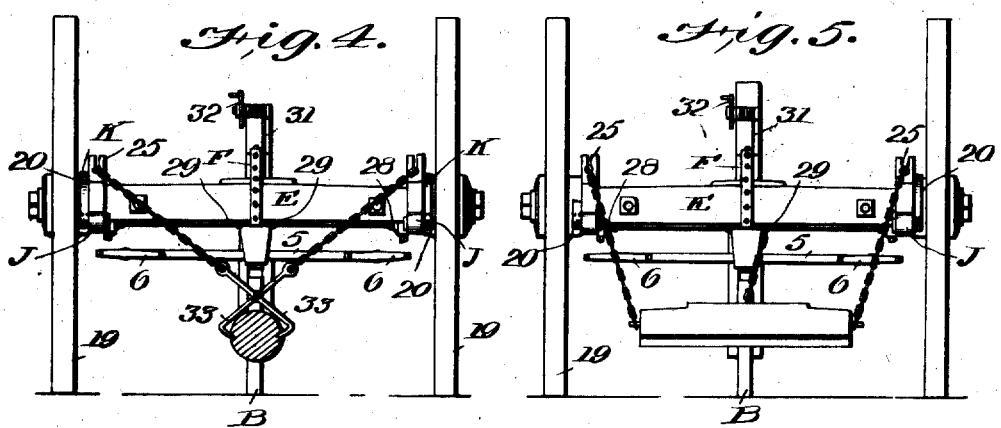
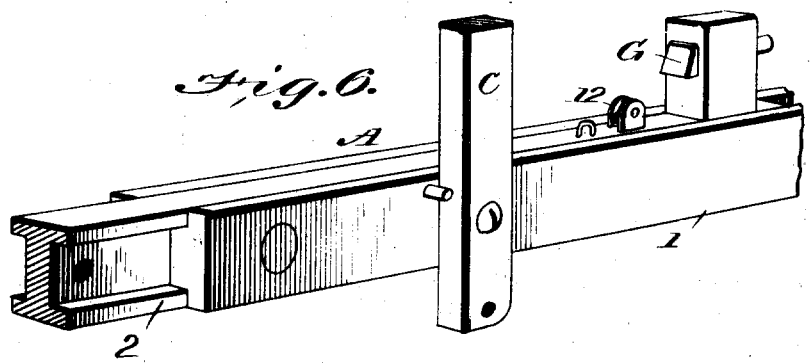
WITNESSES
F. C. Barry
INVENTOR
GUY R. McLERAN
BY Munn & Co.
ATTORNEYS

UNITED STATES PATENT OFFICE.

GUY R. McLERAN, OF NORTH YAKIMA, WASHINGTON.

DRAY-WAGON.

No. 901,252.  Specification of Letters Patent.  Patented Oct. 13, 1908.

Application filed July 13, 1907. Serial No. 383,600.

*To all whom it may concern:*

Be it known that I, GUY R. MCLERAN, a citizen of the United States, and a resident of North Yakima, in the county of Yakima and State of Washington, have invented certain new and useful Improvements in Dray-Wagons, of which the following is a specification.

This invention is an improvement in dray wagons for hauling heavy loads of all kinds, and the invention consists in certain novel constructions and combinations of parts as will be hereinafter described and claimed.

In the drawings Figure 1 is a side view of the wagon, one of the wheels being partly broken away, the axle being shown lowered below the main frame for connection with and discharge of a load. Fig. 2 is a view similar to Fig. 1 showing the axle raised to its position in front of the main frame with the load raised. Fig. 3 is a detail perspective view illustrating the axle, its connection with the main frame, and the mechanism for binding the wheels to the axle in securing a lifting of the levers in adjusting the wagon to receive a load. Fig. 4 is a rear elevation of the wagon adjusted for carrying a log. Fig. 5 is a similar view showing a platform for carrying small articles. Fig. 6 is a detail view illustrating the construction of the main beam whereby it may be extended. Fig. 7 is a detail top plan view of the rear portion of the main beam.

In carrying out my invention I employ what for convenience of reference I term a main frame including a main beam A which may be in sections adjustable longitudinally, as illustrated in Fig. 6, so the wagon can be lengthened, as may be necessary. This sectional construction of the beam provides the rear section 1, which carries the steering wheel B and the rear load-suspending lever C and the front section 2, to which is secured the cross-beam D at the front end of the main beam, as shown. The axle E is connected with the cross-beam of the front section of the main beam and has secured to it the front load supporting lever F which when operated to raise the load is adjusted down above and close to the main beam A and is held in such position by a securing device in the form of a spring latch G supported on the front section 2 of the main beam.

The lever C when adjusted to position to raise and support the load lies alongside the rear section 1 of the main beam to which section it is pivoted, as shown, and is secured in such position by the securing device which may be in the form of a pin bolt H arranged to be adjusted over the swinging end of the lever C to hold the same in position when adjusted to support the load. By this construction and arrangement of the front and rear levers in connection with their respective sections of the main beam, the main beam may be adjusted longitudinally without affecting the operation of the levers C and F as more fully explained hereinafter.

The main beam is provided at its rear end at 3 with a platform adjacent to the upper end of the shaft of the steering wheel B upon which platform the driver may stand in driving and operating the wagon and the steering wheel B has its shaft provided above the platform 3 with a crank arm 4 which may be operated by the legs of the driver when steering the wagon in the operation of the invention. In propelling the wagon the horses may be hitched to swingle-trees 6 on a double-tree 5, and face the large wheels on the front axle E, as will be understood from the drawings.

The front axle E is connected by horizontal pivots I with the cross-beam D so the said beam D may be raised above the axle to the position shown in Fig. 1 of the drawings for connection with a load or may be turned to the elevated position shown in Fig. 2 in front of the cross-beam for raising and carrying the load, said position being shown in Fig. 2 of the drawings. In pivoting the axle E to the cross-beam D, I prefer to provide the beam D at its ends with the pins or projections 7 and the axle E with the lugs 8 extending along the ends of the cross-beam D and having bearings fitting on the trunnions 7, so the axle may be turned to either of the positions shown in Figs. 1 and 2 of the drawings. In thus turning the axle I provide it with the lever F which in the position shown in Fig. 1 projects upwardly and in the position shown in Fig. 2 projects rearwardly over the main beam, being secured in position shown in Fig. 2 by the spring latch G. The front lever F is connected by any suitable cable 9 with the rear lever C so that when the lever F is raised from the position shown in Fig. 2 to that shown in Fig. 1 it will also raise the rear lever as shown.

For operating the lever F from the position shown in Fig. 1 to that shown in Fig. 2, I provide a tackle comprising a cable 10 secured at one end to the main beam, extending thence around a pulley 11 at the swinging end of the lever F and thence under a guide pulley 12 on the main beam and thence to any suitable power by which the lever F may be operated. This power may, if desired, be a drum 13 at the rear end of the main frame, and which drum may also be utilized for storing the cable when the parts are in the position shown in Fig. 2.

The lever C may be similarly operated, its cable 14 being secured at one end to the main frame, passing thence along a pulley 15 at the free end of the lever C, thence through a suitable guide 16 on the main frame, to the drum 17, as shown.

The front axle E is provided at its ends with spindles 18 for the front wheels 19, and the hubs of these wheels 19 are provided at their inner ends with brake drums 20. This swinging axle E is provided with means for supporting and operating the brake band and also with means for connection with the load suspending devices, and these brake band supporting devices and devices for connection of the load suspending devices are preferably provided by means of what, for convenience of reference, I term supplemental frames J having between their ends openings 21 fitting corresponding portions 22 on the axle adjacent to the inner end of the spindles thereof, the said frames J being provided with projecting arms 23, 24 and 25. The arms 23 provide means for connecting one end of the brake bands K and the arms 24 provide bearings for drums L to which the other ends of the brake bands K are secured, while the intermediate arms 25 afford means for connection of the load-suspending devices. The drums L have crank arms 26 to which are secured cables 27 which are carried through guides 28 on the axle, thence through guides 29 on the axle and connected with a slide rod 30, which is operated by a suitable cable 31 from a drum 32 on the main frame. Manifestly, any suitable operating device may be provided for drawing upon the cables to turn the drums L for setting the brake bands, as may be desired in the operation of the invention.

The intermediate arms 25 are suitably adapted for connection with the devices for suspending the front portion of the load, and to this end it may be preferred to slot the arms 25 so the suspending chains may be engaged therewith in any suitable adjustment. The front portion of the load is thus carried by the axle and the rear portion is carried by the lever C to the lower end of which the chains for suspending the load may be secured in any suitable manner.

For carrying logs the chains, as shown in Fig. 4, may be provided with dogs 33 for engagement with the logs, while for carrying a platform, as shown in Fig. 5, the chains may be connected with pins or projections on the platform. Also for carrying beams, such for instance, as are used in structural iron work, chains may be passed below the beams and connect with the arms 25 on the axle.

For holding the load from moving sidewise chains may be suitably disposed from the axle and connected to the chain on the lever C, as will be readily understood by those accustomed to binding loads of this character.

When the parts are in the position shown in Fig. 2, and it is desired to lower the axle E for any desired purpose, the brake bands may be set to lock the wheels on the axle and the wagon be then moved forwardly which will adjust the main frame over the axle E and will raise the lever F to the position shown in Fig. 1, and this lever F when so raised will raise the lever C by the cable connection before described. The lever C and the axle may now be connected with the load and the tackle operated to set the levers F and C to the position shown in Fig. 2 to raise the load, as will be desired in the operation of the invention.

I claim—

1. A wagon substantially as herein described, comprising a main beam having front and rear sections slidably connected and having the front section provided with a cross-beam, a steering wheel mounted in the rear section, an axle having a swinging connection with the cross-beam, a lever connected with the axle and adapted to be operated to swing the same relatively to the cross-beam, a securing device on the front section of the main beam for securing said lever in one position, means for suspending the load from the swinging axle, wheels on the swinging axle, a lever connected with the rear section of the main beam, means for suspending a load from said lever, connections between said lever and the lever on the axle, tackle for operating said levers for raising the load, and means on the rear section of the main beam for securing the lever of said beam when said lever is adjusted to position to support a load, substantially as set forth.

2. A wagon comprising a main beam having front and rear sections, an axle swinging in connection with the front section and having means for supporting a load, a lever carried by the rear section and having means for supporting the load, and means whereby said lever may be operated to raise the load, substantially as set forth.

3. A wagon having a main beam composed of a rear section provided with a steering wheel, and a front section having a cross-beam, an axle having a swinging connection with the cross-beam and provided with a projecting lever whereby it may swing on its connection with the cross-beam, and intermediate devices between the said lever and the main beam whereby the lever may be swung to lift the load suspended from the axle, substantially as set forth.

4. A wagon having a main beam composed of front and rear sections, load supporting devices including levers swinging approximately parallel with each other, and means on the front and rear sections for supporting their respective levers when adjusted to lift a load, substantially as set forth.

5. The combination in a wagon of a main beam, front and rear levers swinging approximately parallel with each other and arranged for operation to lift a load, and tackle between said levers and the main beam whereby they may be operated to raise a load, substantially as set forth.

6. The combination in a wagon with front and rear levers and means in connection therewith for supporting a load, of means for raising the front lever, and connections between said front lever and rear lever whereby the raising of the front lever may also operate to raise the rear lever, substantially as set forth.

7. A wagon having front and rear levers swinging approximately parallel with each other and means in connection therewith whereby to lift and support a load, and means common to both said levers for operating the same, substantially as set forth.

8. The combination with a main beam, and an axle having a swinging connection therewith, of wheels on the axle, a supplemental frame on the axle having arms, a brake band connected to one of the arms, a drum carried by the other arm and connected with the other end of the brake band, said drum being provided with a crank arm, and intermediate devices between said crank arm and the axle whereby the arm may be moved to operate the drum, and the said supplemental frame also having an arm adapted for connection with the load suspending devices, said arms and the drum carrying arm oscillating with the axle in raising and lowering the load, substantially as set forth.

9. The combination of the main beam, an axle having a swinging connection therewith, wheels on the axle and having brake drums and supplemental frames on the axle and having arms and a brake band therebetween and operating on the drums of the wheels and also having intermediate arms adapted for connection of the load-suspending devices, the supplemental frames thus carrying the brake band supporting arms and the load supporting arms, substantially as set forth.

10. The combination of a main beam, an axle having a swinging connection therewith and provided with a projecting lever arm whereby it may be rocked on its connection with the main beam to raise and lower the load, wheels on the said axle and provided with drums, brake bands engaging said drums, and frames on the axle and having means for operating the brake bands and also having means for supporting a load.

11. The combination with a main beam having a cross-beam, of an axle having a swinging connection with the cross-beam, and provided with a projecting lever, wheels on the axle, means on the axle for connection of devices for suspending a load, a lever on the main beam, and having means for connection of load suspending devices, tackle for operating said lever from the main beam, and tackle for operating the lever arm of the axle, substantially as set forth.

12. The combination of a main beam, an axle having a swinging connection therewith, wheels on the axle and means for braking the wheels against turning on the axle whereby the brakes may be set and the beam may then be advanced to adjust it over the axle whereby to lower a load suspended from the axle, substantially as described.

GUY R. McLERAN.

Witnesses:
  FRED A. CLEVELAND,
  GEO. F. McAULAY.